(12) United States Patent
Gannon et al.

(10) Patent No.: US 8,550,354 B2
(45) Date of Patent: Oct. 8, 2013

(54) INDICIA READER SYSTEM WITH WIRELESS COMMUNICATION WITH A HEADSET

(75) Inventors: Colleen P. Gannon, Jordan, NY (US); Eric Trelease, Marcellus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1 day.

(21) Appl. No.: 13/029,411

(22) Filed: Feb. 17, 2011

(65) Prior Publication Data

US 2012/0211563 A1   Aug. 23, 2012

(51) Int. Cl.
*G06K 7/10*   (2006.01)

(52) U.S. Cl.
USPC .................................................. 235/462.44

(58) Field of Classification Search
USPC ..... 235/454, 462.01–462.49, 472.01–472.03, 235/375, 383
See application file for complete search history.

(56) References Cited

U.S. PATENT DOCUMENTS

| | | | |
|---|---|---|---|
| 5,208,449 A * | 5/1993 | Eastman et al. | 235/462.3 |
| 5,324,925 A * | 6/1994 | Koenck et al. | 235/472.01 |
| 5,698,834 A * | 12/1997 | Worthington et al. | 235/472.03 |
| 5,894,119 A * | 4/1999 | Tognazzini | 235/375 |
| 5,971,279 A | 10/1999 | Raistrick et al. | |
| 6,027,023 A | 2/2000 | Nada | |
| 6,332,575 B1 | 12/2001 | Schuessler et al. | |
| 6,532,314 B1 | 3/2003 | Plain et al. | |
| 7,007,849 B2 | 3/2006 | Schmidt et al. | |
| 7,207,488 B2 | 4/2007 | Hammerslag et al. | |
| 7,325,740 B2 | 2/2008 | Schmidt et al. | |
| 2002/0017567 A1 * | 2/2002 | Connolly et al. | 235/472.02 |
| 2003/0020629 A1 * | 1/2003 | Swartz et al. | 340/825.25 |
| 2004/0204120 A1 | 10/2004 | Jiles | |
| 2006/0212938 A1 | 9/2006 | Suzuki | |
| 2009/0310523 A1 * | 12/2009 | Walley | 370/294 |
| 2010/0019040 A1 | 1/2010 | Haber et al. | |
| 2010/0065642 A1 | 3/2010 | An | |

FOREIGN PATENT DOCUMENTS

WO   WO2007/025518 A1   3/2007

* cited by examiner

*Primary Examiner* — Jamara Franklin
(74) *Attorney, Agent, or Firm* — Heslin Rothenberg Farley & Mesiti P.C.

(57) ABSTRACT

An indicia reader system including: an indicia reader to read information bearing indicia (IBI); an actuator for activating the indicia reader; a first device for wirelessly sending audio data; a headphone for wear by the operator, the headphone having a second device for accepting the audio data and at least one audio feedback device provided therein for utilizing the audio data to provide audio feedback to the operator.

19 Claims, 4 Drawing Sheets

INDICIA READER SYSTEM WITH WIRELESS COMMUNICATION WITH A HEADSET

FIELD OF THE INVENTION

The present invention relates to indicia reading systems, and more particularly to an indicia reader system having BLUETOOTH™ communication with an operator wearing a headphone.

BACKGROUND

Indicia reading devices (also referred to as scanners, laser scanners, image readers, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or transceiver for communicating with a remote computer.

Some environments where barcodes are scanned are very loud. The user may have to wear ear protection in this environment. Doing so seriously compromises the user's ability to hear the scanner beep after a barcode has been successfully scanned. Other noises in that environment could be mistaken as a successful scan. The user needs a better way to be certain when a successful scan takes place in these environments.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure may be thorough and complete, and may fully convey the scope, structure, operation, functionality, and potential applicability to those skilled in the art. Wherever possible, the same reference numbers may be used throughout the drawings to refer to the same or like parts. The term "scan" or "scanning" used herein refers to reading or extracting data from an information bearing indicia (or symbol). The term imaging used herein refers to the taking or creation of an electronic image.

Figure 1:
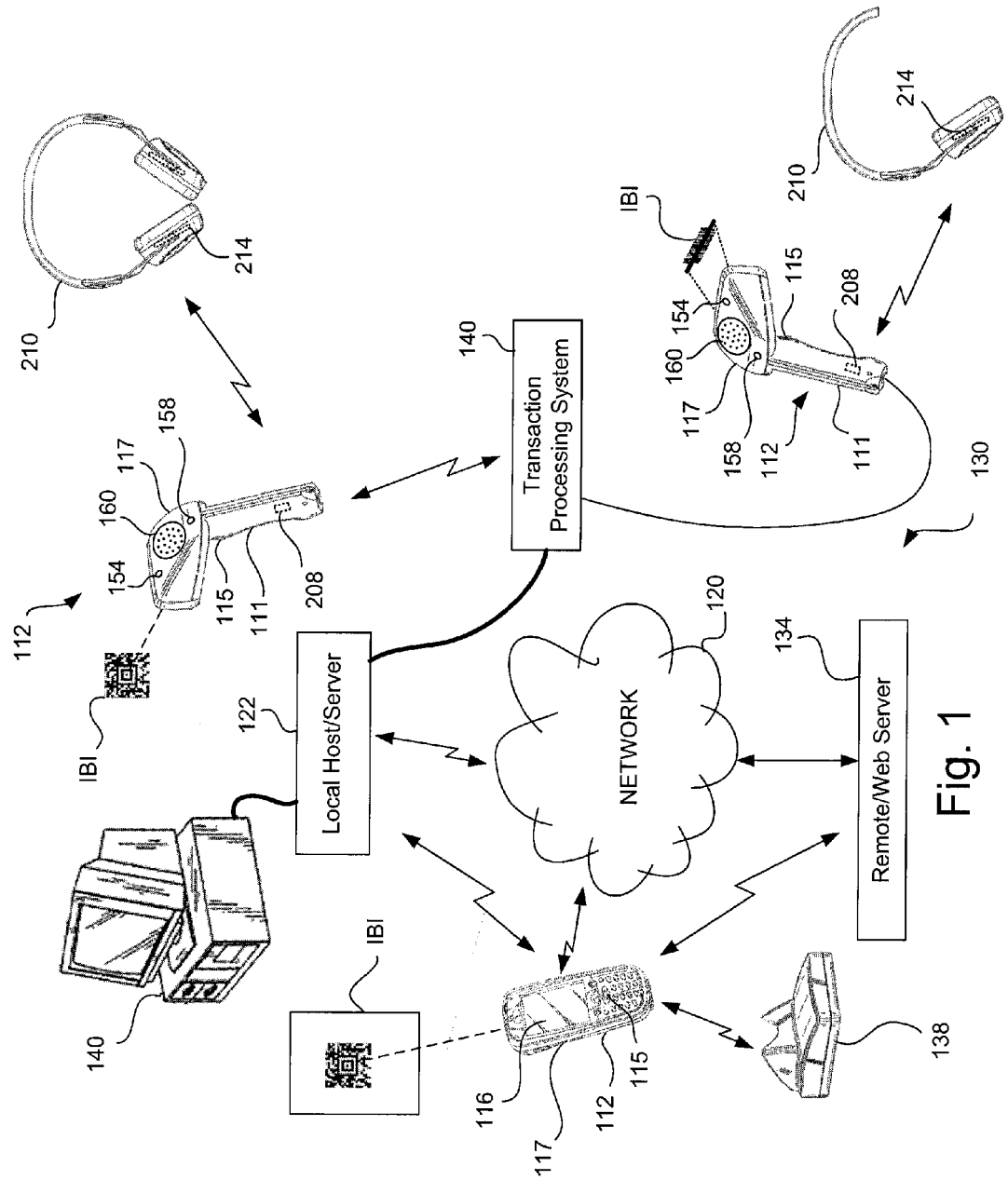
FIG. 1 is a block diagram of an exemplary indicia reader system.

FIG. 1 illustrates an exemplary scanning system configuration, wherein a plurality of indicia readers 112 are operated and utilized where information bearing indicia (IBI) are present. The indicia readers may be stationary or hand-held and may be either laser indicia reading devices (or laser scanners) utilizing transmitted laser light or optical indicia reading devices utilizing image capturing devices for extracting data from IBIs.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. An IBI or dataform may be an originally machine generated symbology that is also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet.

An exemplary indicia reader 112 may have a number of subsystems supported by a housing 117 configured to be hand held, such as by utilization of a handle portion 111. An exemplary indicia reader 112 may have a number of subsystems for providing an operator with feedback as to operation or functionality of the reader. Exemplary indicia reader feedback subsystems may be a display 116 for providing visual feedback, a LED 154 for providing visual feedback, a beeper 158 for providing audio feedback or a speaker 160 for providing audio feedback.

Exemplary indicia readers may be in communication (wired or wireless) to a local transaction processing system 140, such as a cash register, customer station or employee station or local host/server 122 directly or through a charging station or base 138. An exemplary local server 122 or indicia reader 112 may be in communication with network 120 and or a remote/web server 134.

An exemplary indicia reader may have a wireless communication module 208 to make the indicia reader in wireless communication to send audio data signals with a headphone 210 intended to be worn on the head of the indicia reader operator in order to provide audio communications to an operator. An exemplary communication system for this purpose may be BLUETOOTH™ adapter or "dongle".

The technology is useful when transferring information between two or more devices that are near each other in low-bandwidth situations. BLUETOOTH™ may be used to transfer sound data with telephones (i.e., with a BLUETOOTH™ headset or headphone) or byte data with hand-held computers (transferring files).

BLUETOOTH™ is a proprietary open wireless technology standard for exchanging data over short distances (using short wavelength radio transmissions) from fixed and mobile devices, creating personal area networks (PANs) with may have certain levels of security. BLUETOOTH™ uses a radio technology called frequency-hopping spread spectrum, which chops up the data being sent and transmits chunks of it on up to 79 bands (1 MHz each) in the range 2402-2480 MHz. This range may be in the globally unlicensed Industrial, Scientific and Medical (ISM) 2.4 GHz short-range radio frequency band.

BLUETOOTH™ may be a packet-based protocol with a master-slave structure. One master may communicate with slaves in a piconet, wherein all devices share the master's clock. Packet exchange may be based on the basic clock, defined by the master, which cycles at about 312.5 μs intervals. Two clock cycles make up a slot of about 625 μs; two slots make up a slot pair of about 1250 μs. In the simple case of single-slot packets the master transmits in even slots and receives in odd slots; the slave, conversely, receives in even slots and transmits in odd slots. Packets may be varying slots (e.g. 1, 3 or 5) long wherein the master transmit may begin in even slots and the slave may transmit in odd slots.

BLUETOOTH™ provides a secure way to connect and exchange information between devices. BLUETOOTH™ may have many applications: setting up networks, printing, transferring files, or sending audio communication.

A master BLUETOOTH™ device may communicate with up to seven devices in a piconet. The devices may switch roles, by agreement, and the slave may become the master at any time.

At any given time, data may be transferred between the master and one other device (except for the little-used broadcast mode). The master chooses which slave device to address; typically, it switches rapidly from one device to another in a round-robin fashion.

BLUETOOTH™ provides for the connection of two or more piconets to form a scatternet, in which certain devices serve as bridges, simultaneously playing the master role in one piconet and the slave role in another.

Many USB BLUETOOTH™ adapters or "dongles" are available, some of which also include an IrDA adapter.

To use BLUETOOTH™ wireless technology, a device interprets certain BLUETOOTH™ profiles, which are definitions of possible applications and specify general behaviors that BLUETOOTH™ enabled devices use to communicate with other BLUETOOTH™ devices. There are a wide range of BLUETOOTH™ profiles that describe many different types of applications or use cases for devices.

Frequency-hopping spread spectrum (FHSS) is a method of transmitting radio signals by rapidly switching a carrier among many frequency channels, using a pseudorandom sequence known as Transceiver. It is utilized as a multiple access method in the frequency-hopping code division multiple access (FH-CDMA) scheme.

Frequency hopping is one of two basic modulation techniques used in spread spectrum signal transmission, the other being direct-sequence spread spectrum. It is the repeated switching of frequencies during radio transmission, often to minimize the effectiveness of "electronic warfare"—that is, the unauthorized interception or jamming of telecommunications. It also is known as frequency-hopping code division multiple access (FH-CDMA).

Spread spectrum enables a signal to be transmitted across a frequency band that is much wider than the minimum bandwidth required by the information signal. The transmitter "spreads" the energy, originally concentrated in narrowband, across a number of frequency band channels on a wider electromagnetic spectrum. Benefits include improved privacy, decreased narrowband interference, and increased signal capacity.

In an FH-CDMA system, a transmitter "hops" between available frequencies according to a specified algorithm, which can be either random or preplanned. The transmitter operates in synchronization with a receiver, which remains tuned to the same center frequency as the transmitter. A short burst of data is transmitted on a narrowband. Then, the transmitter tunes to another frequency and transmits again. The receiver thus is capable of hopping its frequency over a given bandwidth several times a second, transmitting on one frequency for a certain period of time, then hopping to another frequency and transmitting again. Frequency hopping requires a much wider bandwidth than is needed to transmit the same information using only one carrier frequency.

The spread spectrum approach that is an alternative to FH-CDMA is direct sequence code division multiple access (DS-CDMA), which chops the data into small pieces and spreads them across the frequency domain. FH-CDMA devices use less power and are generally cheaper, but the performance of DS-CDMA systems is usually better and more reliable. Frequency hopping permits the coexistence of several access points in the same area, something not possible with direct sequence.

The waveband may be divided into 75 hopping channels, with power transmission not to exceed 1 watt on each channel to ensure that a single device does not consume too much bandwidth or linger too long on a single frequency.

FHSS is a transmission technology used in LAWN transmissions where the data signal is modulated with a narrowband carrier signal that "hops" in a random but predictable sequence from frequency to frequency as a function of time over a wide band of frequencies. The signal energy is spread in time domain rather than chopping each bit into small pieces in the frequency domain. This technique reduces interference because a signal from a narrowband system will only affect the spread spectrum signal if both are transmitting at the same frequency at the same time. If synchronized properly, a single logical channel may be maintained.

The transmission frequencies are determined by a spreading, or hopping, code. The receiver must be set to the same hopping code and must listen to the incoming signal at the right time and correct frequency in order to properly receive the signal. The protocol may use 75 or more frequencies per transmission channel with a maximum dwell time (the time spent at a particular frequency during any single hop) of 400 ms.

An exemplary indicia reader system includes a BLUETOOTH™ wireless communication connecting ear-protection headset, headphones, earphones or earmuffs 210 with the indicia reader. A BLUETOOTH™ enabled speaker 214 inside the earmuffs may make a sound to verify the barcode has been successfully or unsuccessfully scanned. The user may have their ears protected from the loud environment and still be able to hear when a barcode is scanned. The earmuffs may keep the user from hearing other sounds that could be mistaken as a successful scan or other communication. The user may be able to concentrate on scanning and not be distracted by a loud environment.

In an exemplary embodiment, the earphones 210 may be noise-cancelling headphones. Noise-cancelling headphones reduce unwanted ambient sounds (i.e., acoustic noise) by means of active noise control (ANC). This involves using one or more microphones placed near the ear, and electronic circuitry which uses the microphone signal to generate an "anti-noise" signal. When the anti-noise signal is produced by the speaker driver in the headphone, destructive interference cancels out the ambient noise as heard within the enclosed volume of the headphone.

Retail noise-cancelling headphones may use ANC to cancel the lower-frequency portions of the noise and may use soundproofing to prevent higher-frequency noise from reaching the ear, reducing the demand for complicated electronic circuitry and at higher frequencies, where active cancellation is less effective. To cancel high frequency components (coming at the ear from all directions), the sensor and emitter for the cancelling waveform may have to be close to or adjacent to the user's eardrum.

The scanner may have a BLUETOOTH™ radio in it that may be configured to send an indicator beep to any BLUETOOTH™ enabled headset. The BLUETOOTH™ speaker may also send other audio indications or messages such as out of range, error, low battery, etc. The BLUETOOTH™ radio in the scanner may also be paired to a custom set of ear-protection earmuffs. The user would wear the earmuffs during scanning and hear the beep from the speaker inside the earmuffs when a successful scan is made.

In an exemplary embodiment, an indicia reader system includes: an indicia reader to read information bearing indicia (IBI); an actuator for activating the indicia reader; a first device for wirelessly sending audio data; a headphone for wear by the operator for reducing ambient noise heard by the operator, the headphone having a second device for accepting the audio data and at least one speaker provided therein for providing the audio data to the operator.

In an exemplary embodiment, a method of operating an indicia reader system comprising: providing an indicia reader to read information bearing indicia (IBI); activating the indicia reader; wirelessly sending audio data with a first device; receiving the audio data with a second device, the second device being disposed in a headphone worn on an operator's head; and, broadcasting audio information to the operator using a speaker disposed within the headphone.

Figure 2:
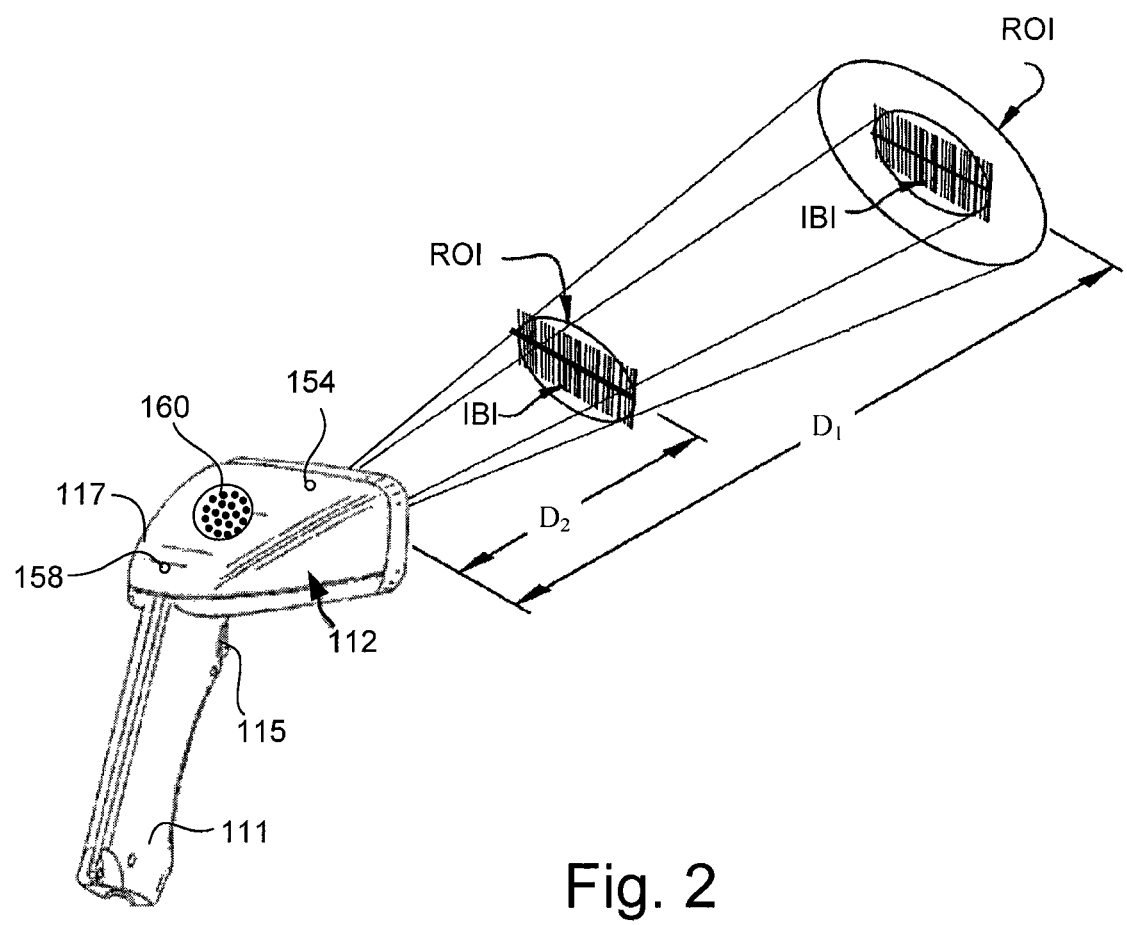
FIG. 2 is a perspective view of an exemplary indicia reader scanning near and far indicia.

FIG. 2 illustrates an exemplary indicia reader 112 configured to scan an IBI located a first distance $D_1$ from the reader in a far scan mode and scan an IBI located a second closer distance $D_2$ from the reader in a near scan mode, wherein the reader alternates scanning in the near and far scan modes with successive pulls on the trigger 115 or pushes on a button.

Exemplary near/far scanning configurations may be the following modes:

A trigger pull initiates only near scan and the reader continues scanning until either good IBI read or a time out.

A trigger pull initiates only far scan and the reader continues scanning until either good IBI read or a time out.

A trigger pull initiates alternating near/far scanning starting at far scanning.

A trigger pull initiates alternating near/far scanning starting at near scanning.

A trigger pull initiates near/far scanning starting at near scanning and switching to far scanning at a next trigger pull, then alternating for successive trigger pulls.

A trigger pull initiates near/far scanning starting at far scanning and switching to near scanning at a next trigger pull, then alternating for successive trigger pulls.

An exemplary trigger may be a standard single click trigger. The various scanning modes may be either preprogrammed or be made menu selectable by an operator. Exemplary trigger functionality may be accomplished in software. In an exemplary embodiment, the reader cannot read an IBI at both distances in only the near scan mode nor read the IBI at both distances in only the far scan mode.

In an exemplary embodiment, a far distance IBI is located out of the scanning range of the reader when operating in the near scan mode.

In an exemplary embodiment, the reader is provided with a single scan engine to scan the IBI at the first distance and a second scan engine to scan the IBI at the second distance, wherein the reader alternates between near and far scanning modes with successive pulls on the trigger 115. Changing near and far scanning modes may be accomplished by changing configuration settings of the scan engine.

In an exemplary embodiment, a reader comprises a dual laser scanner including a near scanning laser and a far scanning laser provided in a single scanning module, wherein either the near scanning laser or the far scanning laser may be selected, for example, with a single scanner trigger. The selection of the near/far laser scanner functionality may be optimized for different scanning environments.

Figure 3:
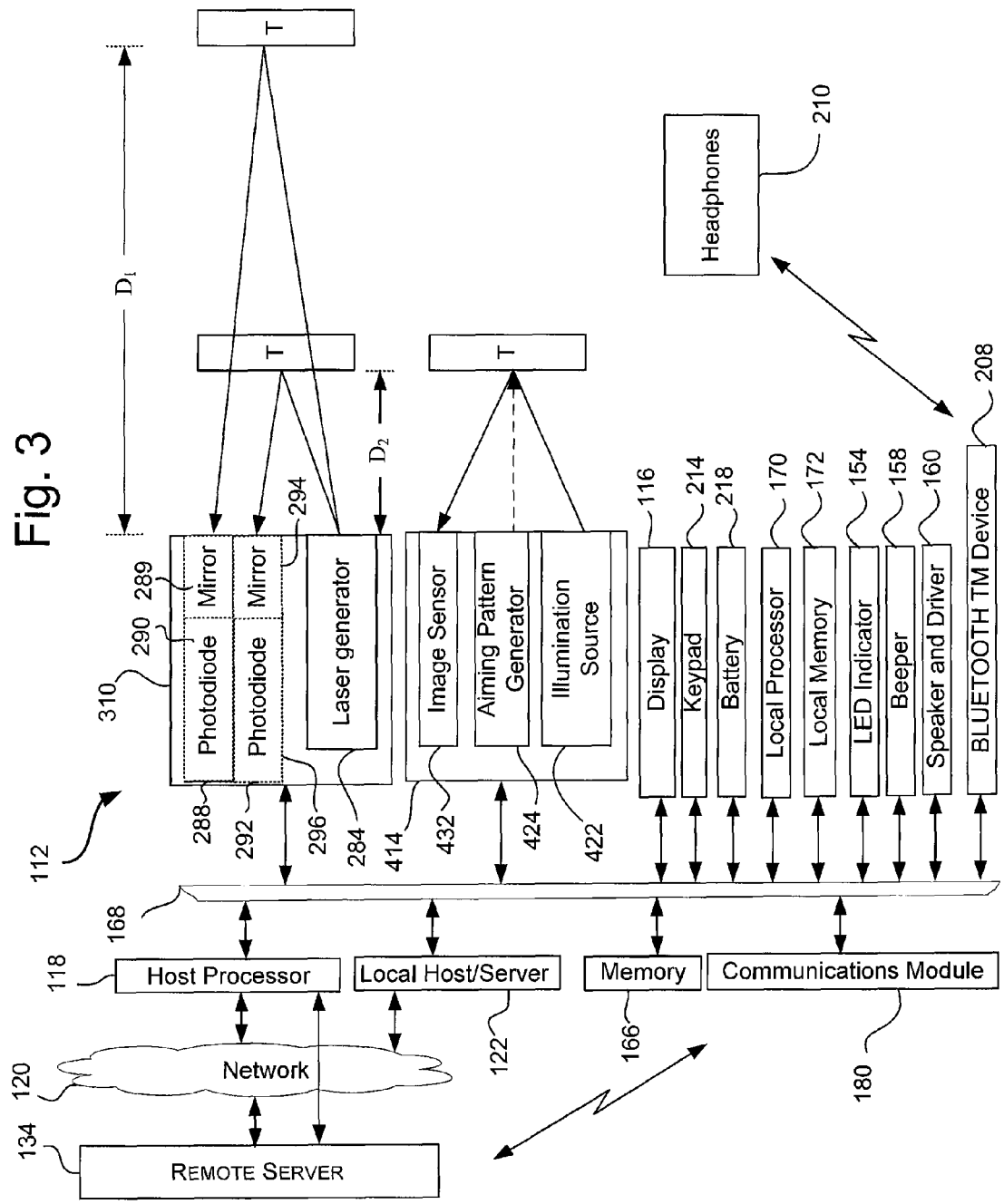
FIG. 3 is a simplified schematic block diagram of an exemplary indicia reader.

Referring to FIG. 3, an exemplary indicia reader 112 may comprise a number of exemplary subsystems, such as a laser scan engine 280 or laser scanning reader systems for reading indicia on a target T. The laser scanning reader system may comprise a laser generator subsystem 284 for scanning a laser light beam across an IBI and a pair of light receive subsystems or circuits. A light receive circuit 288 having a receive mirror 289 and a photodiode 290 for converting laser light reflected off a target T at a far distance $D_1$ having an IBI provided thereon into representative signals thereof. A light receive circuit 292 having a receive mirror 294 and a photodiode 296 for converting laser light reflected off a target T at a closer distance $D_2$ having an IBI provided thereon into representative signals thereof.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream.

Laser light may be described as a spatially coherent, narrow low-divergence beam of light. The output signal of the photodetector may be processed utilizing one or more functions or algorithms to condition the signal appropriately for use in further processing downstream, including decoding of IBIs. Laser scanning reader system 280 may be configured for scanning an IBI at a distance $D_1$ and at a distance $D_2$, which is a shorter distance from the reader 112 than $D_1$.

An exemplary indicia reader 112 my comprise one or more optical image engines (image indicia reader systems or optical scan engines) 414 for reading indicia on a target T. Optical image engines capture and read images to detect and decode IBIs located within the captured images. The optical image indicia reader systems may comprise one or more illumination source(s) 422 for illuminating an IBI with a beam or pattern of incoherent light in the form of an illumination pattern and a light receive circuit comprising an image sensor 432 for converting light reflected off a target T having an IBI provided thereon into representative output signals thereof. The output signal of the image sensor may be processed utilizing one or more functions or algorithms to condition the signal appropriately for use in further processing downstream, including decoding of IBIs.

In an exemplary embodiment, an indicia reader is provided both an optical image indicia reader and a laser scanner indicia reader, the activation of both readers being accomplished by an operator actuating a single trigger with multiple pulls. An indicia reader with dual imagers is described in commonly owned U.S. Pat. No. 5,992,744 entitled OPTICAL READER HAVING MULTIPLE SCANNING ASSEMBLIES WITH SIMULTANEOUSLY DECODED OUTPUTS, the entirety of which is hereby incorporated herein by reference.

The light receive circuit may utilize imaging optics to focus light on the image sensor 432. Illumination source 422 may comprise an illumination source and illumination optics.

An exemplary optical image indicia reader may have an aiming pattern generator 424 for transmitting an aiming pattern on the target to assist an operator to properly scan indicia on the target. The aiming pattern generator may comprise an aiming generator light source, an aiming aperture and aiming optics.

An exemplary image sensor converts light or other electromagnetic energy reflected off of a target and provides an output signal representative thereof. Image sensor may be an array of pixels adapted to operate in a global shutter or full frame operating mode such as a color or monochrome 2D CCD, CMOS, NMOS, PMOS, CID, CMD, back-illuminated, etc. solid state image sensor. The image sensor may contain an array of light sensitive photodiodes (or pixels) that convert incident light energy into electric charge. Solid state image sensors allow regions of a full frame of image data to be addressed.

Illumination and aiming light sources may comprise any light source to provide a desired illumination pattern at the target and may be one or more LEDs. Illumination and aiming light sources with different colors may be utilized. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more local processor(s) 118, a local host/server 122, local memory 166, network 120 or remote server host/server 134.

Other exemplary reader subsystems or components may be a display 116 for providing a GUI for controlling the reader and providing visual feedback, a LED 154 for providing visual feedback, a beeper 158 for providing audio feedback or a speaker, a speaker driver 160 for providing audio feedback and a BLUETOOTH™ transmitter 208.

A speaker is a device for converting electrical energy into acoustical (sound) signal energy that is radiated into a room or open air. The part of the speaker that converts electrical energy into mechanical energy is referred to as the motor, or voice coil. The motor vibrates a diaphragm that vibrates the air in immediate contact with it, producing a sound wave corresponding to a pattern of original speech, music, or other acoustic signal. Speakers have volume and tone control to allow a user to vary the volume, quantity and quality of sounds. Speakers typically have a relatively flat output frequency response over a frequency range from 500 to 10,000 Hz and is suitable for providing audio feedback.

A beeper or sounder is an electroacoustic transducer that converts electrical energy into mechanical energy to emit a more limited volume, quantity and quality of sounds than a speaker. Beepers have less controllability than speakers. Beepers typically have an erratic output frequency response over a frequency range from 500 to 6000 Hz which drops off dramatically at 6000 Hz and is not suitable for providing audio feedback other than simple tones. A typical usage of a beeper is to provide audio feedback of a successful read or an error condition. If the beeper is used to indicate an error condition, only one error tone is used for every kind of error and therefore does not provide good feedback to the operator as to the cause of the error condition. An exemplary beeper is part number MLT-03GC manufactured by Star Micronics.

Communications module 180 may provide a communication link from imaging reader 112 to other indicia readers or to other systems such as a server/remote processor 134 or other devices, such as a headphone 210.

The processor(s) may be located on board or within the housing with other subsystems. The particulars of the functionality of the processor(s) and the reader may be determined by or based upon certain configuration settings or data which may be stored in firmware, remote or local memory.

An exemplary processor may be a mixed-signal array with on-chip controller devices designed to replace multiple traditional MCU-based system components with one single-chip programmable device. It may include configurable blocks of analog and digital logic, as well as programmable interconnects.

The reader subsystems in the reader may be connected by one or more bus 168, data lines or other signal or data communication form. Exemplary forms may be an Inter-IC bus such as a two wire interface (TWI), dedicated data bus, RS232 interface, USB, etc.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered semi-permanent since it remains the same unless it is updated. This firmware update or load may be handled by a device driver.

The processor(s) may be utilized to perform a number of functional operations, which may involve the performance of a number of related steps, the particulars of which may be determined by or based upon certain configuration settings stored in firmware or memory which may be any one of a number of memory types such as RAM, ROM, EEPROM, etc. In addition some memory functions may be stored in memory provided as part of the processor(s).

Exemplary functions of the processor(s) may be controlling operation of the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code contained in the photodetector output signal.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader may use. Two exemplary modes may be continuous or discontinuous. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans one after another (seriatim) and continuously decodes or attempts to decode some or all scanned targets. Discontinuous mode is a mode wherein scanning and/or decoding stops or is interrupted and initiated with an actuation event, such as pulling of a trigger 115, a timeout, or a successful read to restart. An exemplary utilization of the reader in discontinuous mode is via hand held operation. Decoding stops once the indicia reader is no longer triggered. The discontinuous mode is typically initiated because the operator knows a symbol is present.

Exemplary indicia readers may use memory or firmware to store certain reader settings or reader configuration settings. Exemplary configuration settings may be selection of scanning distance, trigger functionality, pre-defined bar code output data based on the scan input, continuous scanning mode, discontinuous scanning mode or routine, decoding mode or routine, I/O configurations, symbology enablement, output interface functionality, min/max symbology character lengths, scan engine selection, illumination functionality, settings that affect the functional operation of the processor(s), which codes are enabled for processing, aimer operation, engine orientation, illumination, photosensor functionality, software control, sales tracking or warranty tracking, reader capabilities, speaker functionality, speaker control, beeper functionality, notification LED functionality etc.

Readers and a host system may be equipped with the ability to automatically query and communicate data, such as configuration settings or firmware amongst each other. Upgrading firmware from host to reader and duplicating configuration settings may be performed without human intervention to ensure readers are operating at the same revision and have the same configuration settings reduces user frustration, down time, data integrity and increase efficiencies.

At predetermined time intervals a host system may broadcast various information, such as firmware revision, configuration settings, etc. The host may then download the newer files and update readers during a time of inactivity. Readers may use on board memory or firmware flash memory to store certain configuration settings.

Readers may be configured by means of bar codes or via serial connection using serial commands. A GUI interface may be utilized for creating or reading serial commands, such as Visual Menu or similar such product. This may be done locally or remotely by connecting the optical reader either directly or through a network (such as the internet) to a remote computer and having the remote computer provide software upgrades.

Software upgrades may be necessary for migration from one reader to new or other readers, possibly different manufacturers. Upgrading may be simplified if the configuration of the reader being replaced is matched or matches the configuration of the equipment that it is replacing.

If reader software is replaced, the reader may have the ability to automatically read out configuration settings information in memory and allow the software to adapt and use different methods of control, or different methods of decoding, etc.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Another exemplary embodiment may be to provide a PC based software tool that analyzes output scanned data of a known information bearing indicia from a suspect reader (a reader suspected of having suboptimal performance or an error condition) and compares it with the output scanned data from a known good reader. The software tool may interpret how the suspect device is configured based on the difference between the two sets of scanned data. After interpolation of the configuration settings of the good reader, the software tool would configure the suboptimal reader to match the good reader. This may be considered indirect mapping, wherein the software tool interpolates the inner settings of an existing device from its operation, rather than by direct read out from memory or firmware.

Either exemplary embodiment may be integrated with a cross-browser, client-side DHTML menu builder such as Visual Menu. The configuration of a reader may be read out once and then propagated many times using wireless or overthe-net configuration utilities, hard copy or video display menuing or other suitable means.

A user may update or replace one or more stored configuration settings or configuration setting data utilizing a remote updating system which may be done by connecting the reader either directly or through a network (such as the internet) to a remote processor. With appropriate software, the remote processor may be programmed to read certain configuration settings from the reader, such as software configuration. The remote processor may read the configuration setting data and utilize that data when downloading updates or new software. An operator may request from the remote processor for a software update. The request would be received by either computer, which could read the current software configuration resident on the optical reader and determine the appropriate update or replacement software.

Figure 4:
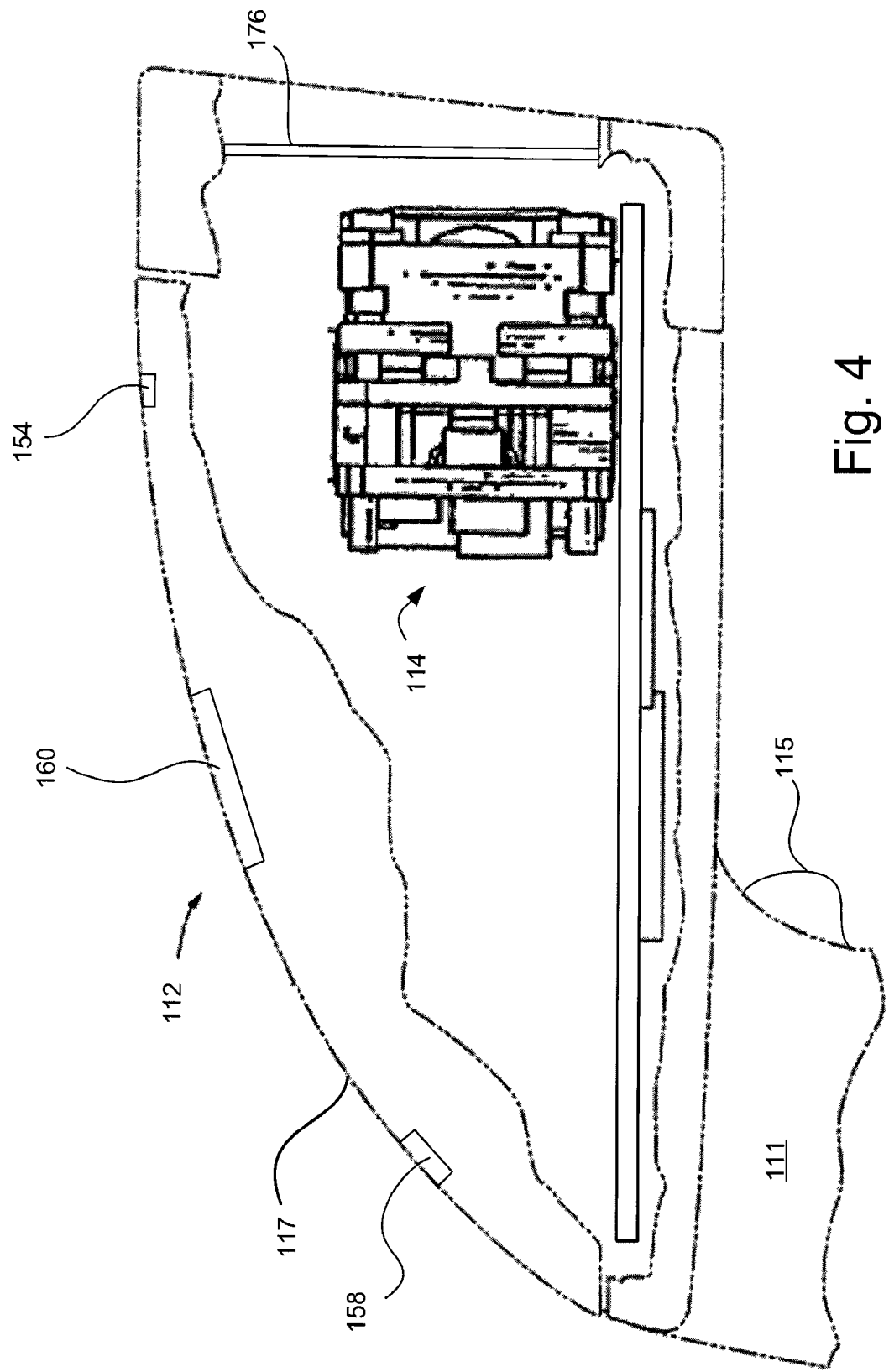
FIG. 4 is a fragmentary partially cutaway side view of an exemplary indicia reader.

Referring to FIG. 4, an exemplary indicia reader 112 includes an imaging assembly 114, a LED 154, a beeper 158 and a speaker 160 packaged in a housing 117. A transparent window 176 protects the imaging assembly 114 and is integral with the housing.

Indicia readers might encounter a myriad of errors, faults, problems or operational situations that causes the indicia reader to misread indicia, not read appropriate indicia or otherwise not function properly or operate in a manner the operator is expecting or operate in a suboptimal manner.

Examples of such situations are:
the reader fails to read an indicia;
the reader is reading indicia too slowly;
the reader is intermittent;
reader performance is degraded.

For these and other situations or error conditions, the operator is not likely to know the source of the problem.

In an exemplary embodiment, an indicia reader is provided with an audio speaker driven by a programmable electrical audio signal wherein the reader stores audio messages within memory. An audio speaker may be located within a headset worn the operator. A processor diagnoses or recognizes when the indicia reader performance is less than optimal or an error condition exists and makes a determination of the cause for the less than optimal performance. Different error conditions or reader operational information would then cause the processor to send different audio messages to a speaker to be broadcast by the speaker to provide the operator with audio voice synthesized information regarding reader performance. An exemplary speaker is part number SCG-16A manufactured by Star Micronics.

The following are exemplary audio messages in response to certain conditions. These messages may be spoken messages or different message noises for each condition. The list is not inclusive of all potential messages and conditions.

| Audio Message | Condition |
|---|---|
| No read reflection. | Scan failed due to specular reflection. |
| No read poor barcode. | Scan failed due to poor quality indicia. |
| Slow reading. | Scan decoding times are slower than optimum. |
| Barcode not enabled. | Scan failed because decoding of the indicia is not enabled. |
| Poor illumination. | Scan performance is degraded due to poor illumination. |
| No barcode in view. | The reader cannot detect an indicia in view. |
| Dirty window. | The transparent window on the reader is contaminated. |
| Low Battery. | The reader battery charge is low. |

| Audio Message | Condition |
|---|---|
| Barcode too far. Pull trigger again. | The reader can't read because it's too far from the indicia. |
| Barcode too close. Pull trigger again. | The reader can't read because it's too close to the indicia. |
| Barcode not recognized. | The indicia is not related to any products. |
| Software update available. | A software update for the indicia reader is available. |
| Overheating | The reader temperature is too high. |
| Not Centered | Only part of the Barcode is in view. |
| Tilt the scanner | Correction for a no read situation. |
| No read buffer full | When operating in batch mode in a cordless scanner. Batch mode allows a scanner to store barcodes that are read while out of range of the base unit and can not communicate. |
| No read buffer full | A transmit buffer is full in a corded scanner while configured in an interface that uses handshaking. |
| No read not linked | Can't read because the cordless scanner is not associated with a base unit and batch mode is not enabled. |
| Out of reader range | The reader is near it's range limit. |
| Headset out of range | The headset is near it's range limit from the reader. |

In an exemplary embodiment, the operator is provided feedback or alerted from a combination of the audible message and a beeper sound or a LED indicator or a displayed message on a reader display.

In an exemplary embodiment, the LED indicator may provide different colors illumination dependent on the type of condition being present. Different levels of performance may be determined and the LED indicator color may change depending on the level of reader performance. For example, the LED indicator may illuminate green when a scan is read and performance is optimal, illuminate yellow when reader performance is less than optimal but the reader is still operational and illuminate red if reader is not operational or may not read a particular indicia.

In an exemplary embodiment, the LED indicator may indicate to an operator that a specular reflection condition exists. The speaker may also broadcast the specular reflection audio message in conjunction with the LED indicator. Specular reflection is the process by which incident light is redirected at the specular (mirror) angle. Specular reflection occurs when light strikes a shiny or mirror-like surface and is reflected away at one angle referred to as the specular angle. The surface of many types of bar code symbols tend to have a shiny or specular surface causing a portion of the incident light from an image reader illumination source to be reflected back into receive optics. The intensity of this light may be significantly higher than the scattered light from the scattering surface of the indicia itself. The result is that the indicia may be locally obliterated by this specular reflection.

In an exemplary embodiment, the speaker output volume is adjustable by the operator or automatically adjusted based on ambient noise.

In an exemplary embodiment, speaker operational settings are part of the configuration settings.

In an exemplary embodiment, a message is broadcast only when reader performance is less than optimal or an error condition exists.

In an exemplary embodiment an indicia reader system including: an indicia reader to read information bearing indicia (IBI); an actuator for activating the indicia reader; a first device for wirelessly sending audio data; a headphone for wear by the operator, the headphone having a second device for accepting the audio data and at least one audio feedback device provided therein for utilizing the audio data to provide audio feedback to the operator.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. An indicia reader system comprising:
   an indicia reader to read information bearing indicia (IBI);
   an actuator activating the indicia reader;
   a first device for wirelessly sending audio data;
   a headphone for wear by an operator, the headphone having a second device for wirelessly accepting the audio data and at least one audio feedback device provided therein for utilizing the audio data to provide audio feedback to the operator; and
   wherein the headphone reduces ambient noise heard by the operator.

2. An indicia reader system in accordance with claim 1, wherein the audio data is sent as a frequency-hopping spread spectrum.

3. An indicia reader system in accordance with claim 1, wherein the first and second devices may switch roles as master and slave to one another.

4. An indicia reader system in accordance with claim 1, further comprising a housing configured for hand held operation for supporting the indicia reader, the actuator, and the first device.

5. An indicia reader system in accordance with claim 1, wherein the headphone is noise-cancelling.

6. An indicia reader system in accordance with claim 1, wherein the audio data alerts the operator of a successful indicia reader read.

7. An indicia reader system in accordance with claim 1, wherein the audio data is a voice message alerting the operator when the indicia reader performance is less than optimal or an error condition exists.

8. An indicia reader system in accordance with claim 1, wherein the audio feedback device comprises a speaker.

9. An indicia reader system in accordance with claim 1, wherein the audio feedback device comprises a beeper.

10. A method of operating an indicia reader system comprising:
    providing an indicia reader to read information bearing indicia (IBI);
    activating the indicia reader;
    wirelessly sending audio data with a first device;
    wirelessly receiving the audio data with a second device, the second device being disposed in a headphone worn on an operator's head;
    broadcasting audio information to the operator using a speaker disposed within the headphone; and
    wherein the headphone is noise-cancelling.

11. A method in accordance with claim 10, wherein the audio data is sent as a frequency-hopping spread spectrum.

12. A method in accordance with claim 10, wherein the audio data is sent as a packet-based protocol with a master-slave structure so that the first and second devices may switch roles as master and slave to one another.

13. A method in accordance with claim 12, wherein the first and second devices may switch roles as master and slave to one another.

14. A method in accordance with claim 10, further comprising supporting the indicia reader, an actuator, and the first device with a housing configured for hand held operation.

15. A method in accordance with claim 10, wherein the audio data alerts the operator of a successful indicia reader read.

16. A method in accordance with claim 10, wherein the audio data is a voice message alerting the operator when the indicia reader performance is less than optimal or an error condition exists.

17. A method in accordance with claim 10, wherein the audio feedback device comprises a speaker.

18. A method in accordance with claim 10, wherein the audio feedback device comprises a beeper.

19. An indicia reader system comprising:
    a handheld or stationary indicia reader to read information bearing indicia (IBI);
    an actuator for activating the indicia reader;
    a first device for wirelessly sending audio data; and
    a headphone for wear by an operator, the headphone having a second device for wirelessly accepting the audio data and at least one audio feedback device provided therein for utilizing the audio data to provide audio feedback to the operator.

* * * * *